(12) United States Patent
Michaelis

(10) Patent No.: US 7,366,499 B1
(45) Date of Patent: Apr. 29, 2008

(54) ANNOUNCEMENT SERVICE FOR THE VISUALLY IMPAIRED

(75) Inventor: Paul R. Michaelis, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 227 days.

(21) Appl. No.: 11/208,843

(22) Filed: Aug. 22, 2005

(51) Int. Cl.
  *H04M 11/10* (2006.01)
(52) U.S. Cl. ............... 455/413; 455/414.1; 455/414.2; 455/456.1; 455/563; 455/569.1; 379/88.01; 379/88.04; 379/207.12
(58) Field of Classification Search ............. 455/413, 455/414.1, 414.2, 456.1, 563, 569.1; 379/88.01, 379/88.04, 207.12
  See application file for complete search history.

(56) References Cited

U.S. PATENT DOCUMENTS

| | | | | |
|---|---|---|---|---|
| 5,470,233 A | * | 11/1995 | Fruchterman et al. ...... | 434/112 |
| 6,148,261 A | * | 11/2000 | Obradovich et al. ........ | 701/208 |
| 6,278,939 B1 | * | 8/2001 | Robare et al. .............. | 701/208 |
| 6,486,784 B1 | * | 11/2002 | Beckers .................... | 340/573.1 |
| 6,502,032 B1 | * | 12/2002 | Newman .................... | 701/213 |
| 6,774,788 B1 | * | 8/2004 | Balfe ..................... | 340/539.13 |

* cited by examiner

*Primary Examiner*—Steven M. D'Agosta
(74) *Attorney, Agent, or Firm*—Yolanda Del Toro

(57) ABSTRACT

A visually-impaired person possessing a GPS-equipped cellular phone, or other mobile communications device, who wants to know their location, uses the cellular phone to call a location-announcement service. In response, the service queries the GPS receiver for the person's geographical coordinates, translates the coordinates into user-friendly information that is readily understandable by the person, and announces the user-friendly information to the person via the cellular phone, all without human involvement.

8 Claims, 2 Drawing Sheets

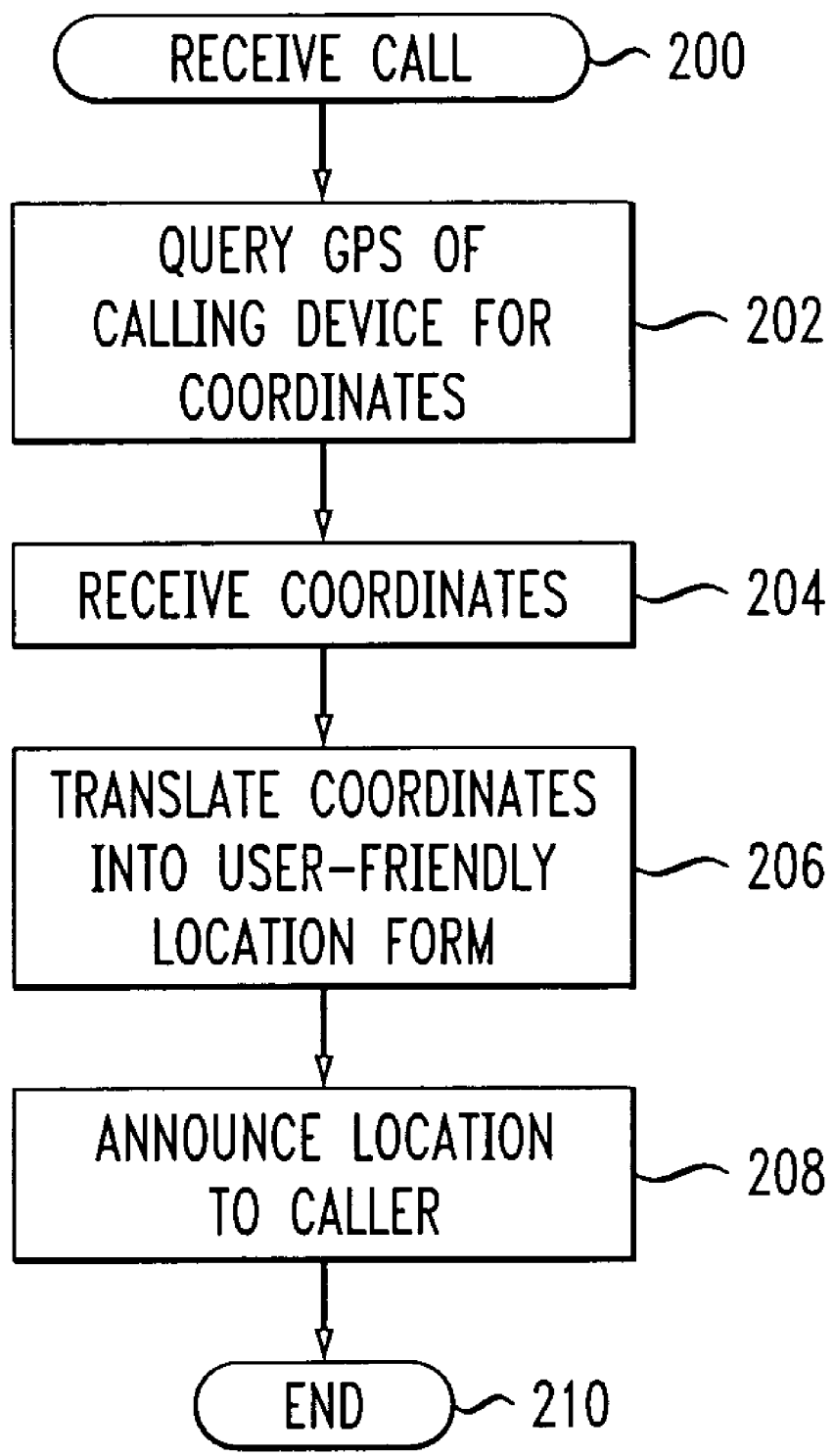

ANNOUNCEMENT SERVICE FOR THE VISUALLY IMPAIRED

TECHNICAL FIELD

This invention relates to the field of navigational services.

BACKGROUND OF THE INVENTION

Global positioning system (GPS)-based navigational aids are well known. In their simplest form, they provide latitude and longitude information. GPS systems that have a greater degree of sophistication are able to translate the raw GPS coordinate data into useful information, such as the user's location with respect to landmarks or potential objectives (e.g., restaurants, automobile service stations). Although the majority of such products present information visually, navigational support systems that present the information by voice do exist. An example is the iGuidance navigation program. In this program, the voice notifications are generated by a device that is co-located with the user and that supports text-to-speech (TTS) conversion, such as a laptop PC. Hence, the device must be TTS-enabled in order for the voice notification to work. This is a significant expense that not everyone wishes to undergo. Moreover, many devices such as inexpensive cellular phones lack the processing power and memory required to support TTS.

GPS-equipped cellular telephones are readily available. It is possible for a centralized server to query these phones, asking them to echo back their GPS coordinates. Indeed, within the prior art, there are services in which a GPS-equipped user may place a cellular phone call to a centralized resource, request navigational assistance, and then receive the information by voice from a person who has access to the caller's GPS data. An example thereof is the "OnStar" service from General Motors Corp., in which the standard end-user configuration includes a cellular telephone and remotely-accessible GPS system. The voiced navigational support received by OnStar customers is from a person, who provides the ability to understand and respond to the unstructured spoken statements and queries of customers, some of which may be from people in emergency situations.

Visually impaired persons may find themselves in new surroundings where they do not know exactly where they are—for example, they may not know what street corner they are standing at. A non-impaired person can merely look around and either read the street signs or recognize the surroundings. But this simple solution is not available to the visually impaired. They must therefore rely on the kindness of passers-by to tell them where they are. The visually-impaired persons could undergo the expense of equipping themselves with TTS-enabled GPS-equipped devices. However, as noted above, this may be a significant and perhaps even a prohibitive expense.

SUMMARY OF THE INVENTION

This invention addresses the problems and disadvantages of the prior art. According to the invention, there is provided an automated location-announcement service. A person possessing a GPS-equipped communications device (a cellular phone, for example), uses the device to call the service. In response, the service queries the GPS for the person's geographical coordinates, translates those coordinates into user (person)-friendly information (such as a street address, names of closest intersecting streets, the name of an adjacent business, or other information that is readily understood by a person) and announces the user-friendly information to the person via the device, all without human involvement.

According to one embodiment of the invention, there is provided an announcement service that operates as follows: In response to a person's communications device establishing a communications connection to a remote server, the remote server queries the device to obtain data therefrom, converts the obtained data into a form that is readily understandable by the person, and provides the converted information to the person via the communications connection and the device. According to another aspect of the invention, a location-announcement service operates as follows: In response to a mobile communications device accompanied by a GPS receiver establishing a communications connections to a remote server, the server queries the GPS receiver via the communications connection to obtain the GPS receiver's geographical coordinates, translates the geographical coordinates into user (person)-friendly form, and announces the user-friendly information to the communications device via the communications connection.

Although characterized above as a method, the invention also encompasses an apparatus that performs the method, as well as any computer-readable medium containing instructions which, when executed in the computer, cause the computer to perform the method.

BRIEF DESCRIPTION OF THE DRAWINGS

These and other features and advantages of the invention will become more apparent from the following description of an illustrative embodiment of the invention considered together with the drawing, in which:

FIG. 2 is a functional flow diagram of operation of a location-announcement service of the environment of FIG. 1.

DETAILED DESCRIPTION

Figure 1:
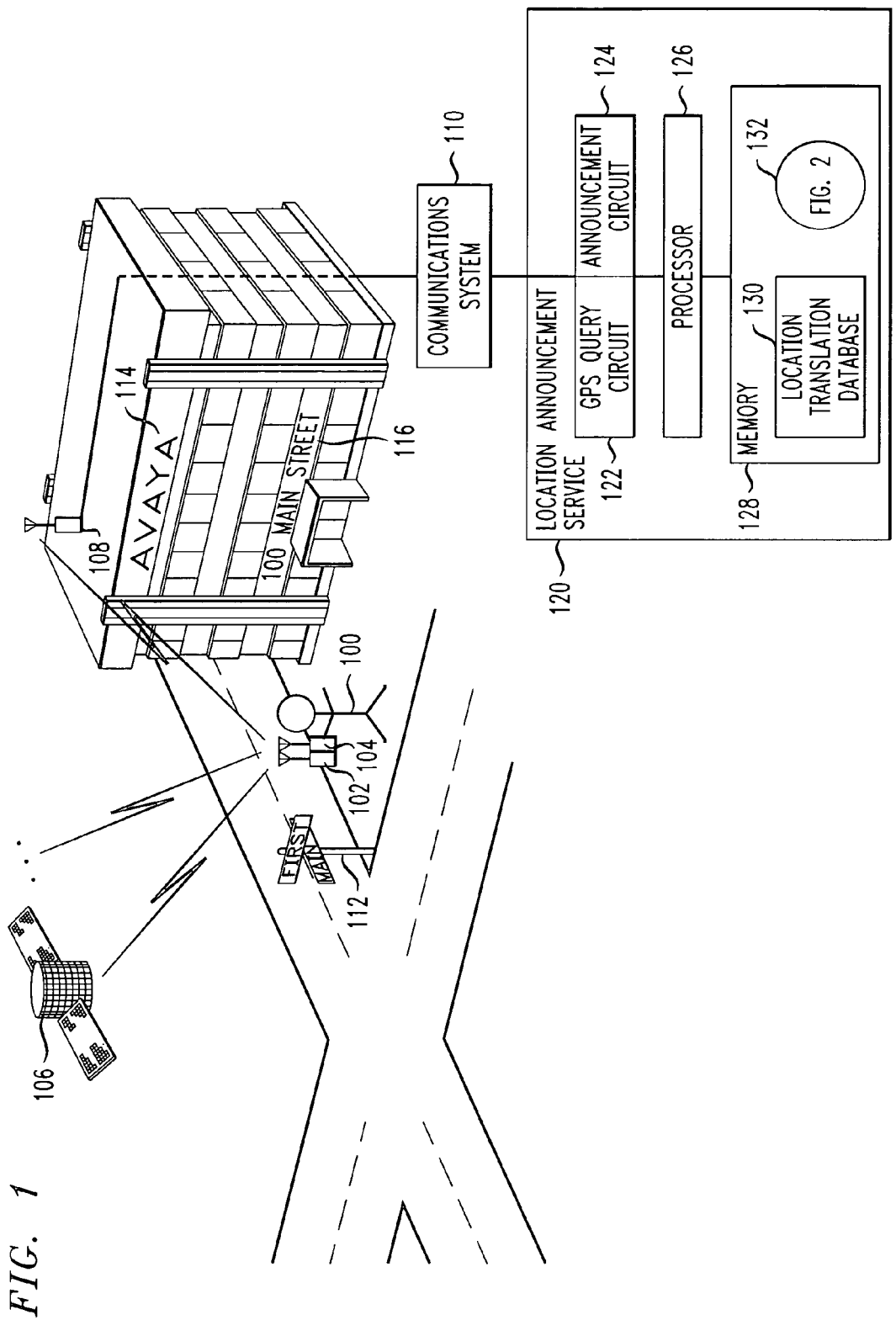
FIG. 1 is a view of a geographical environment that includes an illustrative embodiment of the invention shown in block form.

FIG. 1 shows a geographical environment—a street corner at an office building—that includes an illustrative embodiment of the invention. A person 100 equipped with a wireless communication device (such as a cellular phone or a personal digital assistant, for example) 102 is located in the vicinity of the street corner and building. Device 102 is equipped with a GPS receiver 104 that communicates with GPS satellites 106 to obtain the geographical coordinates where receiver 104 is located. When person 100 wishes to learn his or her location, person 110 establishes a wireless communication connection through a base station 108 of a telecommunications system 110 (such as a telephone system or a WiFi system, for example) to a location announcement service 120. Illustratively, person 100 is a subscriber of service 120, and is identified by service 120 by their account number or caller ID, but preferably service 120 is a public service such as a "900" telephone service or a "411" directory service where calls to service 120 are billed to an account for device 102 by communications system 110.

Location announcement service 120 is an automated service that operates substantially without human involvement. It illustratively comprises a stored-program controlled machine, such as a processor 126 and a memory 128. Memory 128 stores programs and data which processor 126 executes and uses. Memory 128 includes a location translation database 130 that matches geographical coordinates with user-friendly information on corresponding geographical features, such as, names 112 of cross streets at the intersection, a street address 116, or a business name 114. Service 120 further comprises service circuits, such as a GPS query circuit 120 that interrogates GPS receiver 104 through communications system 110 for geographical coordinates, and a voice announcement circuit 124 that announces the user-friendly information from database 130 to the caller through communications system 110. Illustratively, circuits 120 and 124 comprise an interactive voice response (IVR) system. Memory 132 further includes a service program 132. Operation of service 120 under control of program 132 is shown in FIG. 2.

When person 100 calls service 120 on device 102, service 120 receives the call, at step 200, and in response circuit 122 queries GPS receiver 104 through device 102 for its geographical coordinates, at step 202. When receiver 104 supplies its geographical coordinates through device 102 to circuit 122, at step 204, service 120 translates the coordinates into user-friendly location form through database 130, at step 206. Announcement circuit 124 then voices the user-friendly location information to person 100 through device 102, at step 208, and the call ends, at step 210. At step 208, circuit 124 can optionally also announce other location-dependent information to person 100.

Of course, various changes and modifications to the illustrative embodiment described above will be apparent to those skilled in the art. For example, a caller's movements could be tracked, thereby allowing the service to provide feedback such as, "You will reach Main Street in approximately three minutes." Keeping in mind that the application domain is considerably more constrained than what is typical for services such as OnStar, an IVR system that accepts simple voice and/or touchtone queries could be a useful adjunct, assuming that a reasonably small but complete list of likely queries could be identified. (Examples of queries that one might expect include "What restaurants are nearby?" and "In what direction am I moving?" and other requests to which the response varies by location.) Some types of non-GPS information that are maintained on the cellular phone could be made available to visually-impaired users through the same service, in which a user calls a centralized server asking the server to query the phone and report the results by voice. Examples include battery strength, signal strength, last number dialed, received caller ID history, and a directory of personal preferences for voicing a particular user-specified name in response to a particular caller ID. Such changes and modifications can be made without departing from the spirit and the scope of the invention and without diminishing its attendant advantages. It is therefore intended that such changes and modifications be covered by the following claims except insofar as limited by the prior art.

What is claimed is:

1. An announcement service for the visually impaired comprising:
  in response to a person's communications device establishing a communications connection to a remote server, the remote server querying the device to obtain therefrom device data maintained on the communications device;
  in response to the obtaining, the server converting the obtained data into a form that is readily understandable by the person; and
  in response to the converting, the remote server providing the obtained data in the readily-understandable form to the person via the communications connection;
  wherein the obtained data is provided as a response to an option of an interactive voice response (IVR) menu provided by the remote server;
  wherein the device data is selected from at least one of battery strength, signal strength, last number dialed, and received caller ID history.

2. The service of claim 1 wherein:
  the device data is non-GPS information maintained on the communications device.

3. A computer-readable medium comprising instructions which when executed by the computer, cause the computer to perform the method of claim 1.

4. An apparatus comprising means for performing the steps of the method of claim 1.

5. An announcement service for the visually impaired comprising:
  in response to a person's communications device establishing a communications connection to a remote server, the remote server querying the device to obtain therefrom device data maintained on the communications device;
  in response to the obtaining, the server converting the obtained data to audible form; and
  in response to the converting, the remote server announcing the obtained data in audible form via the communications connection as a response to a an option of an interactive voice response (IVR) provided by the remote server;
  wherein the device data is selected from at least one of battery strength, signal strength, last number dialed, and received caller ID history.

6. The service of claim 5 wherein:
  the device data is non-GPS information maintained on the communications device.

7. A computer-readable medium comprising instructions which, when executed by the computer, cause the computer to perform the method of claim 5.

8. An apparatus comprising means for performing the steps of the method of claim 5.

* * * * *